United States Patent
Deutsch et al.

(10) Patent No.: US 10,261,854 B2
(45) Date of Patent: Apr. 16, 2019

(54) MEMORY INTEGRITY VIOLATION ANALYSIS METHOD AND APPARATUS

(71) Applicant: Intel Corporation, Santa Clara, CA (US)

(72) Inventors: Sergej Deutsch, Hillsboro, OR (US); Karanvir S. Grewal, Hillsboro, OR (US); Michael E. Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 15/283,059

(22) Filed: Sep. 30, 2016

(65) Prior Publication Data
US 2018/0095812 A1    Apr. 5, 2018

(51) Int. Cl.
| | | |
|---|---|---|
| *G06F 11/00* | (2006.01) | |
| *G06F 11/07* | (2006.01) | |
| *H04L 9/14* | (2006.01) | |
| *G06F 9/455* | (2018.01) | |
| *G06F 1/24* | (2006.01) | |
| *H04L 9/08* | (2006.01) | |
| *H04L 9/32* | (2006.01) | |

(52) U.S. Cl.
CPC ............. *G06F 11/079* (2013.01); *G06F 1/24* (2013.01); *G06F 9/45558* (2013.01); *G06F 11/073* (2013.01); *G06F 11/0751* (2013.01); *H04L 9/0866* (2013.01); *H04L 9/14* (2013.01); *H04L 9/3226* (2013.01); *G06F 2009/4557* (2013.01); *G06F 2009/45591* (2013.01)

(58) Field of Classification Search
USPC .......................................................... 714/37
See application file for complete search history.

(56) References Cited

U.S. PATENT DOCUMENTS

| | | | | |
|---|---|---|---|---|
| 8,799,681 | B1 * | 8/2014 | Linnell ................... | G06F 21/62 380/277 |
| 2012/0297057 | A1 * | 11/2012 | Ghosh .................... | G06F 21/575 709/224 |
| 2013/0151861 | A1 * | 6/2013 | Gan ....................... | G06F 21/125 713/189 |
| 2013/0246865 | A1 * | 9/2013 | Resch .................. | G06F 11/0727 714/54 |
| 2015/0355984 | A1 * | 12/2015 | Hayes ................. | G06F 11/2069 714/6.3 |
| 2016/0124826 | A1 * | 5/2016 | Sugahara ................ | G06F 11/27 714/30 |
| 2017/0285976 | A1 * | 10/2017 | Durham ................ | G06F 3/0619 |

OTHER PUBLICATIONS

David M. Durham et al., "Memory Integrity With Error Detection and Correction," U.S. Appl. No. 14/998,054, filed Dec. 24, 2015, 84 pages.
David M. Durham et al., "Convolutional Memory Integrity," U.S. Appl. No. 15/089,140, filed Apr. 1, 2016, 78 pages.

* cited by examiner

*Primary Examiner* — Sarai E Butler
(74) *Attorney, Agent, or Firm* — Schwabe, Williamson & Wyatt, P.C.

(57) ABSTRACT

Methods, apparatus, and system to analyze a memory integrity violation and determine whether its cause was hardware or software based.

21 Claims, 7 Drawing Sheets

MEMORY INTEGRITY VIOLATION ANALYSIS METHOD AND APPARATUS

FIELD

The present disclosure relates to a computing device, in particular to memory integrity and determining the cause of a memory integrity violation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Key domain selectors, also referred to as 'crypto-colors', are values used to annotate memory data structures for enhanced security. Key domain selectors participate in a memory encryption process as encryption tweaks, effectively acting as if a different key was used to encrypt the content/data being stored in memory. Key domain selectors associate encrypted memory content/data with specific uses, code paths, or instances of executing applications, allowing different access control policies to be applied to different software domains. Using key domain selectors, computer systems can offer increased protection against a range of corruption events and attacks, such as, for example, software bug-related corruption events (e.g., Use-After-Free, UAF), buffer overflow attacks, physical attacks on memory, and malware attacks including inappropriate memory accesses due to return oriented programming (ROP) injected malware, among others. Key domain selector sizes can range from few bits (1, 2) to large numbers of bits (e.g., 32, 64 or 128).

Notwithstanding protection against corruption events and attacks provided by key domain selector techniques, memory integrity may still be compromised by deliberate attacks on both hardware and software and by bugs and errors found in both hardware and software. Legacy key domain selector techniques improve identification of memory integrity violations, but do not identify or determine a cause thereof.

Figure 1:
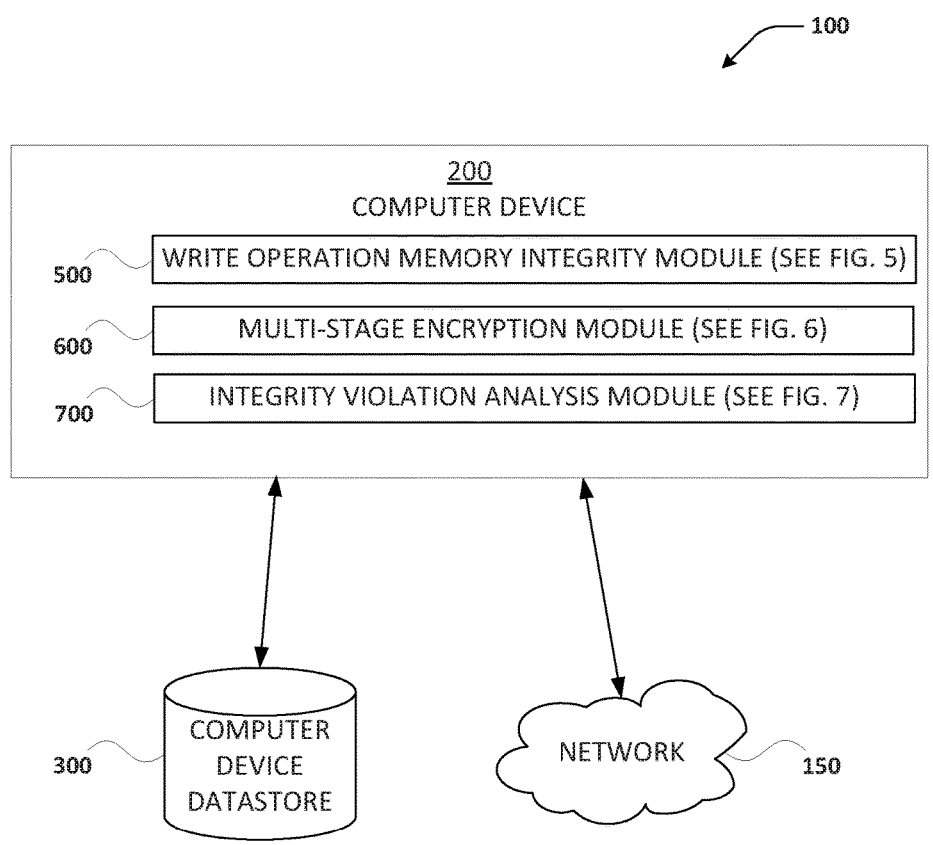
FIG. 1 is a network and device diagram illustrating an example of at least one computer device in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, the term "module" (or "logic") may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of an application executing on a processor and a thread corresponds to a portion of the process.

As used herein, processor may include one or more execution core(s). The processor may be configured as one or more socket(s) that may each include one or more execution core(s).

As used herein, "address structure" refers to a structured computer memory in which data (which, unless otherwise defined herein, includes both process instructions and data) is or may be stored. Generally, computer memory includes an array of memory cells arranged in rows and columns, partitioned into independently addressable storage locations or cells according to an address structure.

As used herein, "address space" is a range of addresses within an address structure.

As used herein, "virtual address space" is a set of virtual addresses that an operating system makes available to a process. A memory management unit ("MMU") may automatically translate virtual addresses to physical addresses.

As used herein, "virtual memory" refers to a memory management technique which maps virtual addresses used by program(s) to physical addresses in computer memory. Virtual memory, as may be managed by an MMU, may free processes from having to manage a shared memory space, may increase security through memory isolation (in which different address spaces are assigned to different processes), and may allow processes to use more memory than may be available in a particular physical memory structure, such as through the "paging" technique.

As used herein, "paging" is a memory management technique in which a computer system stores and retrieves data from secondary storage (also known as external memory or auxiliary storage, which may be non-volatile) into main memory (often located in RAM, which may be volatile).

As used herein, "domain" refers to an address space, which may not be contiguous. Domains may be assigned to processes and threads by operating systems and virtual machine managers ("VMMs").

As used herein, "key domain" is a region of memory, such as a domain (which may not be contiguous), encrypted with at least one common encryption key, generally for the purpose of managing or controlling access, permissions, data integrity and/or execution. The granularity of a key domain is variable and can range from a cache line to larger memory regions, such as memory regions assigned to or used by a page, a thread, an application, or a virtual machine ("VM").

As used herein, a "key domain selector" is a mathematical construct which encodes key domain information; key domain selectors may be encoded in unused physical address bits (or in other metadata) passed, for example, through cache. Key domain selectors may be used to generate and decrypt cryptographic memory integrity values, allowing software memory allocation routines and logic to control the assignment of pointers to, for example, implement one or more access control policies. As with key domains, key domain selectors may be applied at a variety of granularities, from cache lines, to blocks, to pages, to threads, to part of a page (e.g. cache lines), and the like. Key domain selectors may map different key domain address aliases to the same physical memory location. Accordingly, by mixing virtual memory mappings and cache line granularity aliasing, any page in memory may contain a different set of aliases at the cache line level and be non-deterministic to an adversary. For further information regarding key domain selectors that involve the usage of unused physical address bits, see co-pending U.S. patent application Ser. No. 15/089,140, entitled "Convolutional Memory Integrity," filed on Apr. 1, 2016, which application is hereby incorporated by reference.

Key domain selectors may be assigned to or determined for various VMs, processes, threads, pages, cache lines and the like by a user, by an OS, by a VMM, or by applications (which may provide "hints" or "tweaks" used to generate or perturbate a key). Key domain selectors may be use, for example, to select an encryption key, such as key 310, from a key table, such as one stored in a hardware register. Key domain selectors may be used, for example, as an input to derive a key, such as in hardware, on the fly (during execution). Key domain selectors may be used, for example, as part of an encryption "tweak" in tweakable ciphers, such as AES-XTS. As discussed herein, selector 305 records record key domain selectors and spatial selectors (also discussed further herein) used by an operating system and/or a virtual machine monitor. A selector 305 assigned to a VM, process, thread, page, cache line, etc., by an operating system and/or virtual machine monitor is also referred to herein as an "intended key selector".

In embodiments where key domain selectors are managed by the operating system and may be used as input (i.e., tweaks) to encryption and integrity algorithms, it may be challenging for devices to access the same data (e.g. via direct memory access ("DMA")), without devices also being aware of these key domain selectors. It may also be challenging to successfully decrypt content/data which is encrypted using some original address information as tweak, while the content/data has been moved to a different physical address, without keeping records of the history of the physical locations of the content. Specifically, when some memory content/data is encrypted using key domain selector information, this information, together with the physical address is directly included as input to the encryption process. The granularity of such content/data can be a page (e.g. 4 KB) or part of a page (e.g. a cache line). In order for the necessary level of security to be supported, the tweak needs to derive not only from the key domain selector but also from the physical address of the content/data. Such information is referred to as "spatial selector". When content/data is paged in and out of memory, content/data is moved to a different physical address. Software, in this case, needs to be able to retrieve the content/data using the new physical address where the content/data is stored while using the original key domain selector. This is not possible if the content/data is encrypted using a tweak that derives from both the original address and key domain selector. Furthermore, reversing any encryption transformation applied to the page before paging out has the drawback that any key domain selector information associated with the page content/data is lost, unless key domain selector information is maintained separately on a per data structure basis, which is costly.

These challenges may be illustrated with the following example. Consider a physical page P1 having two data structures, d1 and d2, at two different locations with different physical addresses within page P1. The data structures are encrypted using tweaks that derive from different key domain selectors. That is, data structure d1 is encrypted using a first key domain selector (kds1), and data structure d2 is encrypted using a second key domain selector (kds2). In each case, the key domain selector and the physical address is bound to the encrypted content/data as a tweak and use in the encryption to protect the content/data. When the physical page P1 is paged out, the content/data of the page can no longer be in encrypted form. This is because the tweak used by the encryption process is specific to the physical address of page P1. When the content/data is placed back to memory, in a different physical page P2, software should be able to retrieve the content/data using a new tweak based on the new physical address of P2 and the original key domain selectors. This is not possible unless the content/data is completely decrypted when paged out into a hard disk. This also presents a challenge to the device driver, as it needs to be aware of key domain selector values when moving the content/data between secondary and main memory.

As used herein, direct memory access ("DMA") refer to hardware subsystems which can access main system memory (generally RAM) or another hardware subsystem independent of a central processing unit. Subsystems which use DMA include disk drive controllers, graphics cards, network cards, sound cards, and intra-chip data transfer components in multi-core processors.

In overview, this disclosure relates to methods and systems in a computing device apparatus to determine the cause of a memory integrity violation. If a computer system can determine whether a memory integrity violation was caused by a hardware- or software-based problem (whether caused, for example, by a bug, environmental radiation or spurious current, or deliberately caused), the computer system may be designed to respond in different ways. For example, if a software-based memory integrity violation is identified, then an operating system or virtual machine monitor may respond by providing debug services in relation to a process which caused the memory integrity violation or by terminating the process which caused the memory integrity violation. If a hardware-based memory integrity violation is identified, then the computer system may respond by resetting computer hardware and/or by providing a message that computer hardware needs to be serviced (such as if a reset is not effective).

Figure 5:
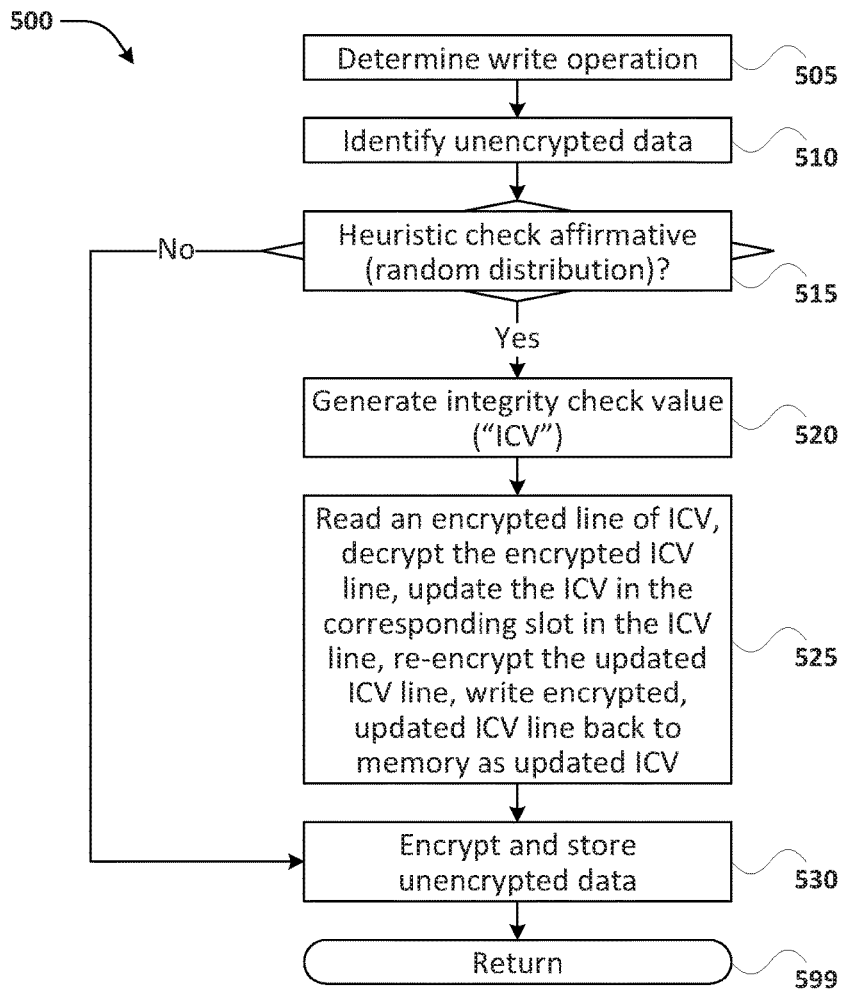
FIG. 5 is a flow diagram illustrating an example of a method performed by a write operation memory integrity module, according to some embodiments.
Figure 6:
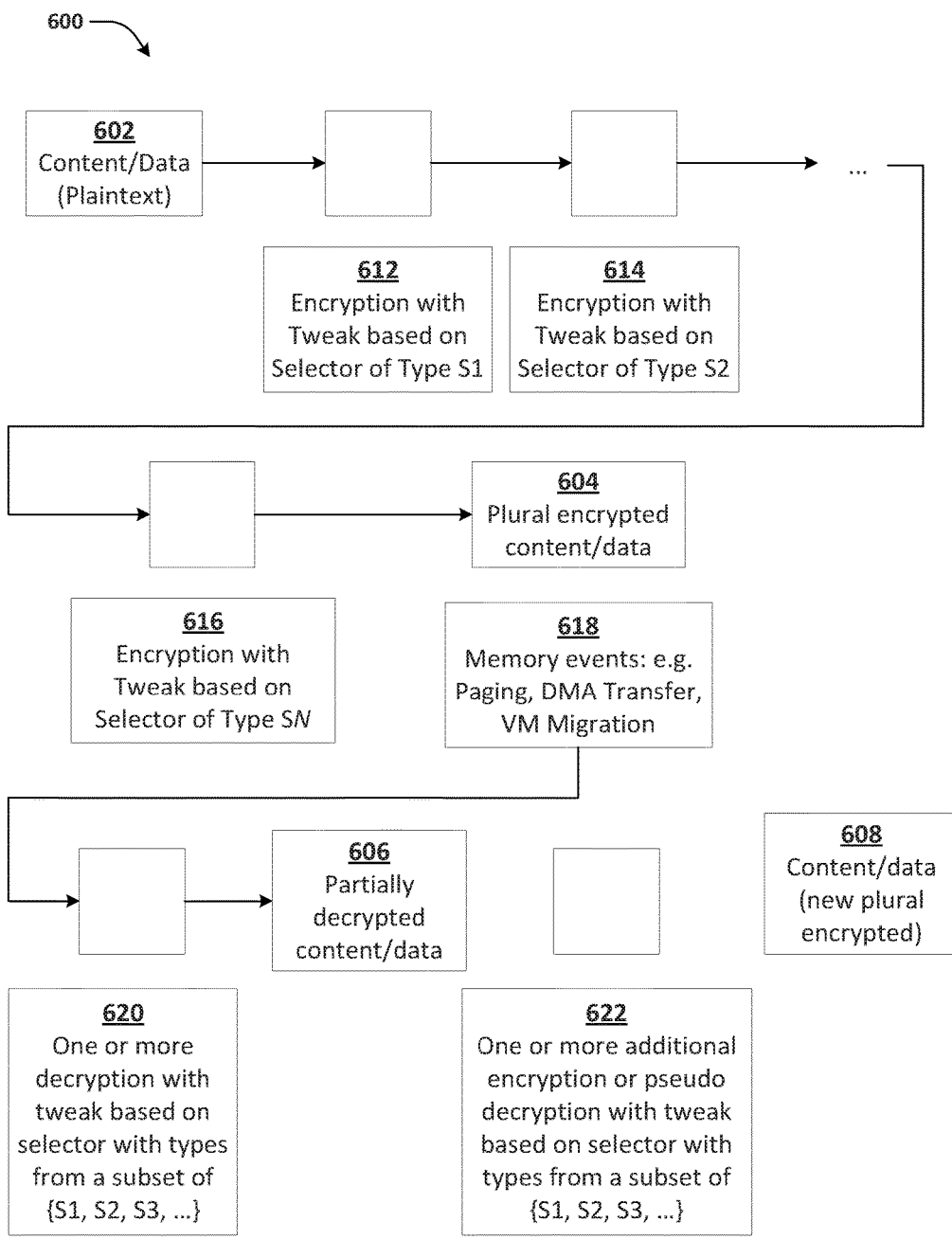
FIG. 6 is a flow diagram illustrating an example of a method performed by a multi-stage memory integrity module, according to some embodiments.

A limited set of key domain selectors and corresponding keys may be used to encrypt a unit of data, including via single and/or multi-stage encryption techniques (examples of which are provided herein). These techniques may also generate an integrity check value ("ICV") based on plaintext and ciphertext of the unit of data (examples are illustrated in FIGS. 5 and 6). When memory events occur in relation to the unit of data, such as paging, DMA transfer, VM migration, and the like, data decrypted from the encrypted unit of data may be checked, such as with a heuristic, for the presence of order above a threshold. If the heuristic check fails (if the data is found to appear to be random during the heuristic check), then the ICV can be checked. If the ICV passes its check, then the seemingly random data may be intentional; however, if the ICV fails its check, then the encrypted unit of data may be decrypted using other key domain selectors in the set of key domain selectors. If another key domain selector in the limited set of key domain selectors can be found which does not produce corrupted plaintext, then it can be determined with reasonable confidence that a process caused the memory integrity violation. If no key domain selector can be found to produce uncorrupted plaintext, then it can be determined with reasonable confidence that a hardware problem caused the memory integrity violation. Different responses can then be taken, depending on the determined cause of the memory integrity violation.

FIG. 1 is a network and device diagram illustrating an example of at least one computer device 200, computer device datastore 300, and network 150, incorporated with the teachings of the present disclosure, according to some embodiments. In embodiments, computer device 200 may comprise write operation memory integrity module, multi-stage memory integrity module, and integrity violation analysis module (to be described more fully below).

Computer device 200, except for the teachings of the present disclosure, may include, but is not limited to, a desktop computer, a laptop computer, a tablet computer, an ultraportable computer, an ultramobile computer, a netbook computer and/or a subnotebook computer, a server computer, a workstation computer, and devices incorporating computers, including gaming computers, mobile telephones, a smart phones, feature phones, virtual reality and augmented reality displays or supporting computers therefore, televisions, vehicles, drones, mobile Internet devices, and so on, or combinations thereof.

Also illustrated in FIG. 1 is computer device datastore 300. Computer device datastore 300 is described further, herein, though, generally, it should be understood as a datastore used by computer device 200 and may comprise any and all memory available to computer device 200, including registers, caches, main memory, secondary memory, and the like.

Also illustrated in FIG. 1 is network 150. Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

Figure 2:
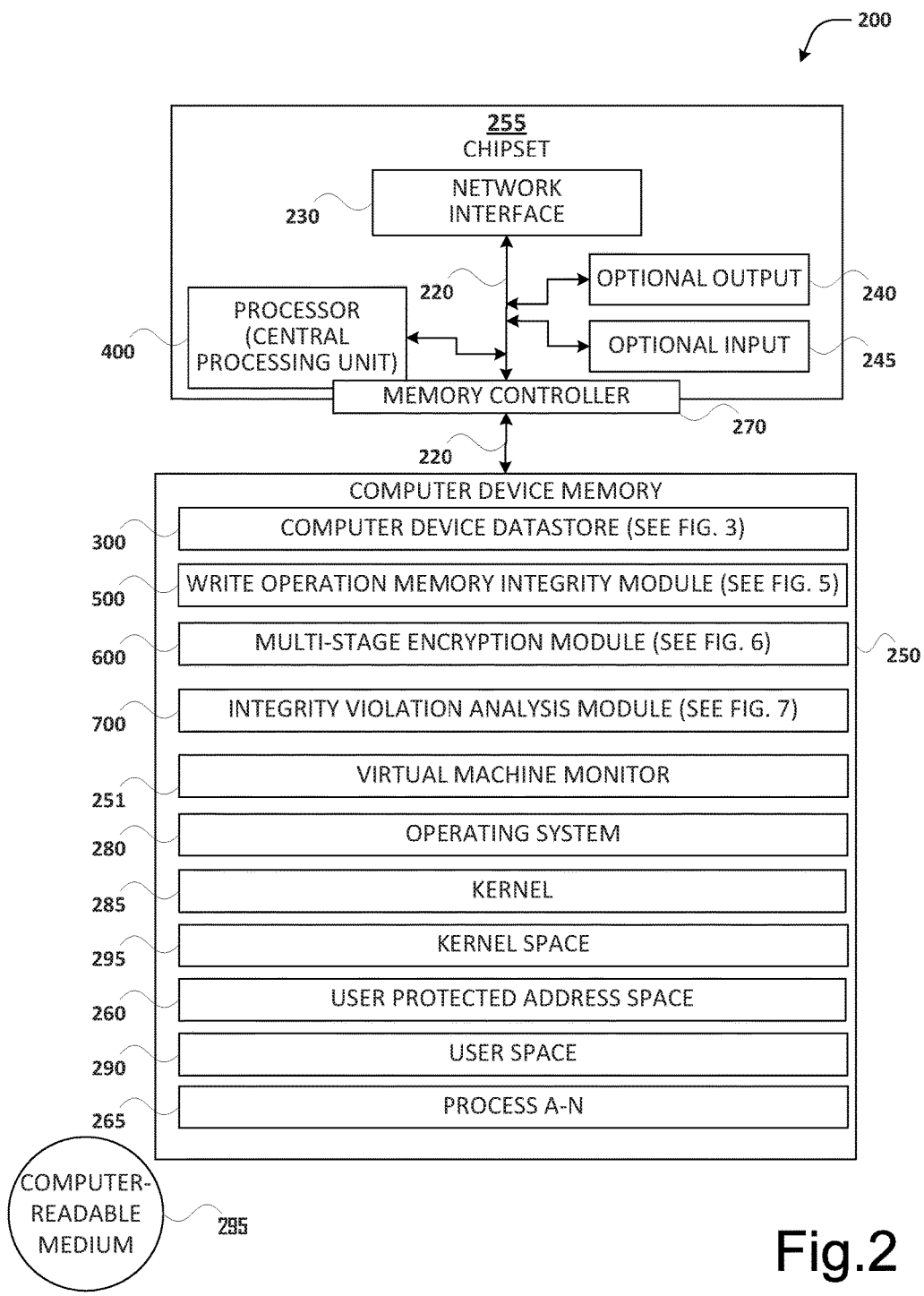
FIG. 2 is a functional block diagram illustrating an example of a computer device incorporated with teachings of the present disclosure, according to some embodiments.

FIG. 2 is a functional block diagram illustrating an example of computer device 200 incorporated with the teachings of the present disclosure, according to some embodiments. Computer device 200 may include chipset 255, comprising processor 400, input/output (I/O) port(s) and peripheral devices, such as output 240 and input 245, network interface 230, memory controller 270, and computer device memory 250, all interconnected via bus 220. Network Interface 230 may be utilized to form connections with Network 150, with computer device datastore 300, or to form device-to-device connections with other computers. Processor 400 is discussed and illustrated further in relation to FIG. 4.

Memory controller 270 interfaces with memory, such as with RAM, DIMMs, permanent mass storage and the like, to control access rows in memory. As illustrated in FIG. 2, memory controller 270 may be part of (or overlap with) processor 400; memory controller 270 may also connect with one or more of bus 220, controlling access to computer device memory 250. As illustrated further in FIG. 4, memory controller 270 may comprise memory integrity modules, such as write operation memory integrity module 500 and multi-stage encryption module 600, and encryption engines 416.

Chipset 255 may include communication components and/or paths, e.g., buses 220, that couple processor 400 to peripheral devices, such as, for example, output 240 and input 245, which may be connected via I/O ports. For example, chipset 255 may include a peripheral controller hub (PCH). In another example, chipset 255 may include a sensors hub. Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer device memory 250 may generally comprise a random access memory ("RAM", including one or more dual in-line memory modules "DIMMs"), a read only memory ("ROM"), and a permanent mass storage device, such as a disk drive or SDRAM (synchronous dynamic random-access memory). Computer device memory 250 may store program code for software modules or routines, such as, for example, write operation memory integrity module 500, multi-stage encryption module 600 (illustrated and discussed further in relation to FIG. 6) and integrity violation analysis module 700 (illustrated and discussed further in relation to FIG. 7).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
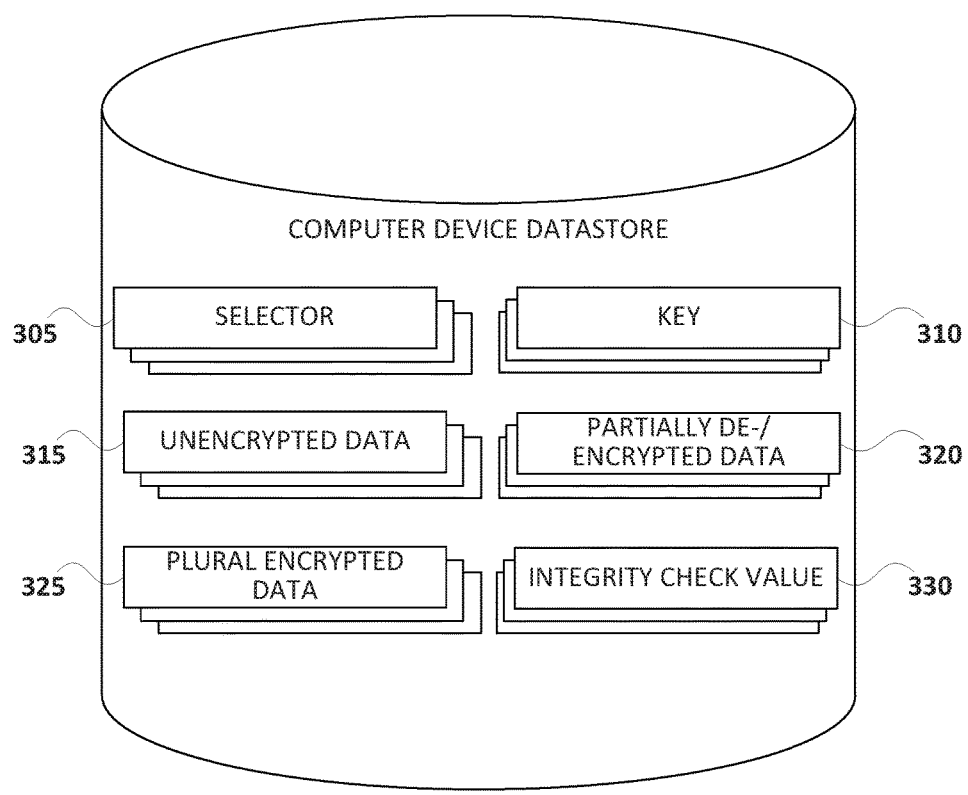
FIG. 3 is a functional block diagram illustrating an example of a computer device datastore for practicing the present disclosure, consistent with embodiments of the present disclosure.

Computer device memory 250 is also illustrated as comprising kernel 285, kernel space 295, user space 290, user protected address space 260, and computer device datastore 300 (illustrated and discussed further in relation to FIG. 3).

Computer device memory 250 is also illustrated as comprising virtual machine monitor 251, which may monitor and manage virtual machine instances executed by computer device 200.

Computer device memory 250 may store one or more process A-N 265 (i.e., executing software application(s)). Process 265 may be stored in user space 290. Process 265 may include one or more other processes. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. One or more process 265 may be unable to directly access kernel space 295. In other words, operating system 280 and/or kernel 285 may attempt to protect kernel space 295 and prevent access by process A-N 265.

Kernel 285 may be configured to provide an interface between user processes and circuitry associated with computer device 200. In other words, kernel 285 may be configured to manage access to processor 400, chipset 255, I/O ports and peripheral devices by process 265. Kernel 285 may include one or more drivers configured to manage and/or communicate with elements of computer device 200 (i.e., processor 400, chipset 255, I/O ports and peripheral devices).

Computer device 200 may also comprise or communicate via one or more bus 220 with computer device datastore 300, illustrated and discussed further in relation to FIG. 3. In various embodiments, bus 220 may comprise a storage area network ("SAN"), a high speed serial bus, and/or via other suitable communication technology. In some embodiments, computer device 200 may communicate with computer device datastore 300 via network interface 230. Computer device 200 may, in some embodiments, include many more components than as illustrated. However, it is not necessary that all components be shown in order to disclose an illustrative embodiment.

FIG. 3 is a functional block diagram of the computer device datastore 300 illustrated in the computer device of FIG. 2, according to some embodiments. The components of computer device datastore 300 may include data groups used by modules and/or routines, e.g, selector 305, key 310, unencrypted data 315, partially decrypted or encrypted data 320, plural encrypted data 325, and integrity check value 330. The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

The components of computer device datastore 300 are discussed further herein in the discussion of other of the Figures. Following is an overview of these records.

In overview, selector 305 record records key domain selectors and spatial selectors. Key domain selectors and spatial selectors are defined herein.

In overview, key 310 is a cryptographic key selected, defined, and/or modified according to selector 305.

In overview, unencrypted data 315 is a record, which may be transient, temporary, semi-permanent or permanent, comprising one or more units of content/data (in plaintext), such as from a process or application executed by computer device 200, to be written to computer device memory 250, including via paging. Unencrypted data 315 may include a plurality of bits. The plurality of bits may include one or more bits (e.g., a byte, etc.) in any code representation, such as binary code, octal code, hexadecimal code, symbolic code, decimal code, alphanumeric code, higher-level programming language code, and so on, or combinations thereof. For example, a memory reference instruction may include a byte for an opcode, bits for an address, and so on, wherein the bits of the memory reference instruction may be represented in hexadecimal code (e.g. machine language), in symbolic code (e.g., assembly language), and so on, or combinations thereof. Additionally, the plurality of bits may be translated to and/or from binary code, wherein the binary code may be executed by the cores 410A, 410P, etc., and may be sorted at computer device memory 250, may be fetched from computer device memory 250, and so on, or combinations thereof.

In overview, partially decrypted or encrypted data 320 is a record, which may be which may be transient, temporary, semi-permanent or permanent comprising one or more units of content/data, such as one or more unencrypted data 315 records, which have been partially encrypted or decrypted by one or more encryption engines, as described herein.

In overview, plural encrypted data 325 is a record comprising one or more units of content/data, such as one or more unencrypted data 315 records and/or partially de-/encrypted data 320 records, which have been encrypted by one and/or a plurality of encryption engines, as described herein.

In overview, integrity check value 330 is a record prepared through use of a special purpose key and encryption techniques which generate integrity check value 330 records based on plaintext and ciphertext of the unit of data (or a portion thereof), as described herein. Integrity check value 330 records may be used to confirm integrity of data units, encrypted or de-encrypted using techniques described herein.

Figure 4:
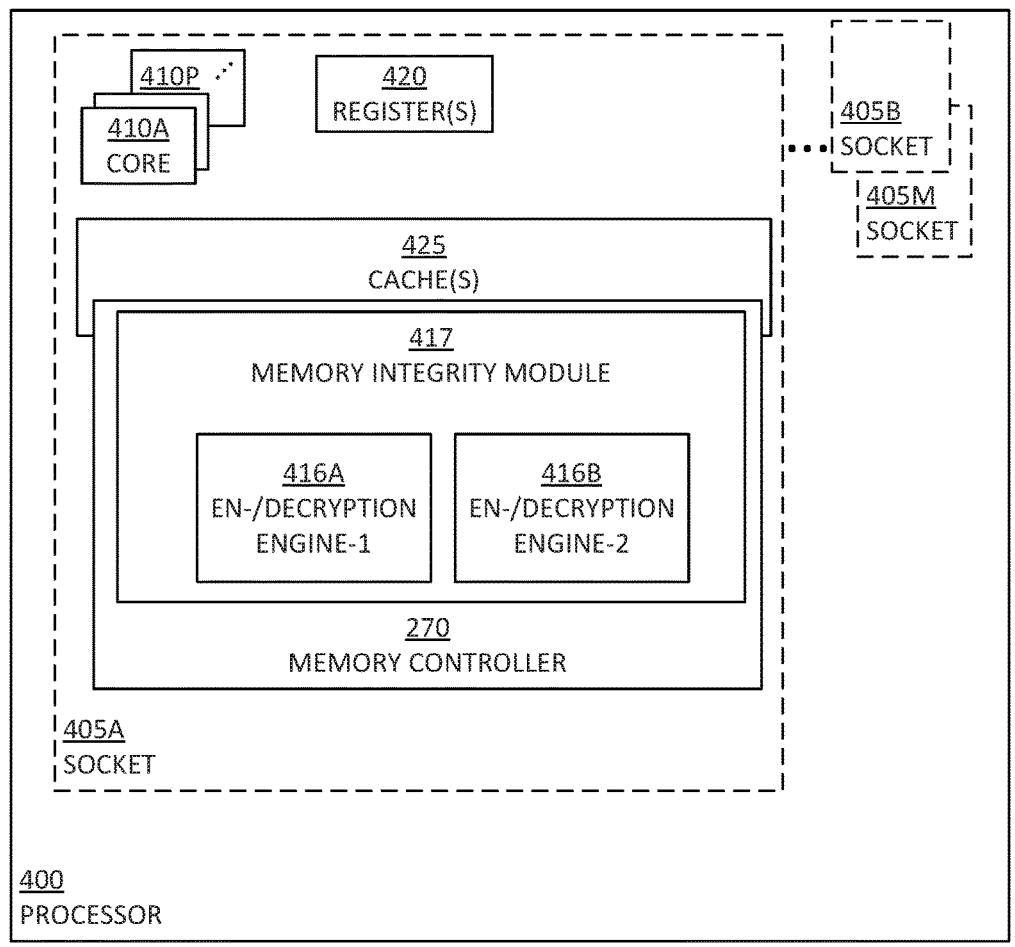
FIG. 4 is a functional block diagram illustrating an example of a processor found in computer device, consistent with embodiments of the present disclosure.

FIG. 4 is a functional block diagram illustrating an example of processor 400, consistent with embodiments of the present disclosure. As illustrated in FIG. 4, processor 400 includes one or more execution core(s) 410a, . . . , 410p, which may be central processing units ("CPUs") and/or graphics processing units ("GPUs") a plurality of registers 420 and one or more cache memor(ies) 425. Processor 400 may include a memory controller 270 to manage memory accesses between processor 400 and computer device memory 250; in some embodiments, memory controller maybe located partially or fully outside of processor 400, such as toward or in computer device memory 250.

In some embodiments, processor 400 may be configured as one or more socket(s) 405a, . . . , 405m and each socket, e.g., socket 405a, may include one or more core(s) 410a, . . . , 410p, a plurality of registers 420 and one or more cache memor(ies) 425. Each core 410a, . . . , 410p may be configured to execute one or more process(es) and/or one or more thread(s). The plurality of registers 420 may include a plurality of general purpose registers, a status register and an instruction pointer. Cache(s) 425 may include one or more cache memories. One or more levels of cache 425 may be disposed outside of processor 400, such as between processor 400 and computer device memory 250.

Also illustrated in processor 400 is memory integrity module 417. Memory integrity module 417 may be part of and/or be provided by memory controller 270. Memory integrity module 417 may comprise and/or be provided by, for example, write operation memory integrity module 500, multi-stage encryption module 600, and/or integrity violation analysis module 700. Memory integrity module 417 may comprise encryption and decryption engines, encryption/decryption engine-1 416A and encryption/decryption engine-2 416B (referred to herein as "encryption engines"; it should be understood that encryption and decryption may be performed by separate units). The encryption engines may include any type of cipher to generate cyphertext such as, for example, a block cipher in any desired mode of operation to generate ciphertext (e.g., unreadable output from an encryption process) from unencrypted data, as well as the reverse processes with respect to encrypted data. The block cipher may include a fixed block size, wherein the block cipher may be repeatedly implemented to encrypt data larger than the block size. For example, the block cipher may include advanced encryption standard (AES) in a propagating cipher-block chaining (PCBC) mode of operation, in an electronic code book (ECB) mode of operation, and so on, or combinations thereof. In addition, the block cipher may include an expandable block size.

Memory integrity module 417 and the encryption engines may encrypt each unit of content/data to be stored into computer device memory 250, over one or more stages using, for example, one or more selectors of different types {s1, s2, . . . }, and encryption engines may fully decrypt, partially decrypt or pseudo decrypt encrypted unit of content/data from computer device memory 250, over one or more stages, using at least a subset of the plurality of selectors of different types {s1, s2, . . . }. In embodiments, in each stage, a single type of selector and a single type of encryption/decryption algorithm, approach or technique are used for each unit of data.

For the illustrated embodiments, memory integrity module 417 with encryption engines (416A and 416B) may be disposed across processor 400, cache(s) 425 and memory controller 270. In some embodiments, all stages of memory integrity module 417 with encryption engines (416A and 416B) may be disposed in memory controller 270.

FIG. 5 is a flow diagram illustrating an example of a method performed by write operation memory integrity module 500, according to some embodiments. Write operation memory integrity module 500 may be performed by, for example, computer device 200. An inverse process may be performed during read operations.

Write operation memory integrity module 500 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in write operation memory integrity module 500 may be written in any combination of one or more programming languages, including an object oriented programming language such as Java, Smalltalk, C++ or the like and conventional procedural programming languages, such as the "C" programming language or similar programming languages.

Illustrated block 505 determines that a write operation is to be executed. At block 510, unencrypted data, such as unencrypted data 315, including a plurality of bits that is involved in the write operation is identified. The unencrypted data may include, for example, plaintext of a data line. In addition, the write operation may originate from a CPU and/or cache that is to write a data line/cache line to external memory (e.g., DRAM).

Decision block 515 may determine whether the plurality of bits includes a random distribution. For example, decision block 515 may utilize a heuristic (e.g., a compression function, repeating bytes beyond a threshold value, etc.) to determine whether the data line to be written to memory approximates random or not.

If decision block 515 determines that the data line is not random or is ordered (e.g., sufficiently ordered, includes a pattern above a threshold, does not include a random distribution of bits, etc.) or equivalent, block 530 may encrypt the data line, for example, using selector 305 and key 310, and sends ciphertext of the data line to the memory. For example, such ciphertext may be stored as one or more plural encrypted data 325 records (which do not necessarily have to be encrypted more than once).

If decision block 515 determines that the data line is random (e.g., is insufficiently indistinguishable from random) or equivalent, block 520 may generate an integrity check value ("ICV") for the data line, for example, using a special-purpose key for generation of ICVs, a key 310, or the like. The integrity check value may be stored as, for example, one or more integrity check value 330 records.

At block 525, write operation memory integrity module 500 may read encrypted ICV of block 520, such as integrity check value 330, may decrypt a line of the encrypted ICV, may update the line of the integrity check value 330, such as according to a selector 305 assigned to the data line/cache line to be written to external memory (the update may, for example, incorporate or "diffuse" values of selector 305 and/or key 310 into the line), may re-encrypt the updated integrity check value 330 line, such as using the key of block 520, and may write the updated re-encrypted line of integrity check value 330 back to memory as an update to the integrity check value 300 record. Block 525 may be performed in relation to only one line of integrity check value 330 record or may iterate over one or more lines of integrity check value 330 record.

Block 525 may store any or all integrity check lines and/or integrity check value 330 records to cache memory, such as cache 425, to speed up adjacent memory accesses by providing access to recently cached integrity check lines rather than immediately storing integrity check lines to main memory. In this regard, an evicted integrity check line may be written to main memory when the cache memory runs out of space. For example, a least recently used (LRU) cache eviction process may be utilized.

At block 530, write operation memory integrity module 500 may then encrypt the unencrypted data, such as unencrypted data 315, of block 510. Encryption may be performed utilizing selector 305 to select key 310, which key is then used to encrypt unencrypted data 315, forming an encrypted data record which may be written to memory, such as computer device memory 250 as, for example, one or more plural encrypted data 325 records (which need not be plural encrypted).

At block 599, write operation memory integrity module 500 may return, for example, to block 505, to another process which may have called it, and/or may conclude.

Referring now to FIG. 6, illustrating an overview of a multi-stage (split-diffusion) encryption module 600, according to various embodiments. Multi-stage encryption module 600 may encrypt content/data and store it in memory such that it, when it is later accessed, its integrity can be verified with a high degree of certainty. Multi-stage encryption module 600 may be executed by, for example, computer device 200.

Multi-stage encryption module 600 may include one or more units of content/data (in plaintext) 602 (which may be temporarily stored or represented in computer device memory 250 as one or more unencrypted data 315 records). Multi-stage encryption module 600 may write the plaintext content/data to computer device memory 250 or page back into computer device memory 250, through one or more encryption stages 612, 614, . . . 616 e.g., by a plurality of encryption engines, using a plurality of tweaks based on a plurality of selectors of different types {s1, s2, . . . sn} (which may be stored or represented in computer device memory 250 as one or more selector 305 records), into plural encrypted content/data 604 (which may be temporarily stored or represented in computer device memory 250 as one or more plural encrypted data 325 records), prior to storing each unit into computer device memory 250. One or more of selector 305 may be a key domain selector while other of selector 305 may be a spatial selector.

In embodiments, in each stage, a single type of selector and/or a single type of encryption/decryption and/or key 310 may be used for each unit of content/data. At each stage, the selector type based tweak may be used in any one of a number of manners to affect the cryptographic key, such as key 310, or the way the encryption process is performed, e.g., but not limited to (i) as a tweak value used as in tweakable block cipher; (ii) as a value that impacts the key generation process where the bits of the selectors are diffused into the bits of the cryptographic key; (iii) as the actual cryptographic key itself; and (iv) as a selector used for accessing the appropriate key from a lookup table. In embodiments, where a selector is used to identify a key, the corresponding keys of the selectors can be independently updated. Thus, for these embodiments, continuous replay protection may be provided by changing the key value for one selector, and then swapping and updating the memory contents from a previous selector/color value to the rekeyed one. Such continuous replay protection may be provided even with only two selectors/colors (black and white). For example, the key for one selector/color (e.g., black) may be independently changed and updated, while copying the memory contents from the other (white into black) to prevent an adversary from replaying the previous memory contents (e.g. that were previously black using the previous key). For encryption/decryption, at each stage, the encryption/decryption may be any one of a number of encryption/decryption algorithms, approaches or techniques, known in the art, including, but are not limited to, Advanced Encryption Standard (AES), ThreeFish, Triple Data Encryption Standard (3DES), Speck, Simon, Prince, and so forth. For AES encryption/decryptions, the ciphers may be, but are not limited to, electronic codebook (ECB) mode ciphers, Xor-encrypt-xor (XEX)-based tweaked-codebook mode with cipher text stealing (XTS) block ciphers, Liskow Rivest Wagner (LRW) ciphers or cipher block chaining (CBC) ciphers.

Additionally, in response to memory event 618, such as, paging multiple units of content/data out of computer device memory 250, DMA of stored plural encrypted units of content/data 606 in computer device memory 250, or moving plural encrypted units of content/data 606 in computer device memory 250 in association with a VM migration, multi-stage encryption module 600 may include partially decrypting 620 each plural encrypted unit of content/data 604, e.g., by one or more decryption engines, over one or more decryption stages 620, using one or more tweaks based on a subset of one or more of the plurality of selectors of different types {s1, s2, . . . }, to generate partially decrypted units of content/data 606 (which may be stored or represented in computer device memory 250 as one or more partially de-/encrypted data 320 records). Similarly, in each stage, a single type of selector corresponding to the selector type used for encryption, may be used for each unit of content/data, and the tweak may be used in a manner similar to encryption during the same stage.

Thereafter, partially decrypted units of content/data 606 may be additionally encrypted or pseudo decrypted, over one or more encryption/decryption stages, using one or more tweaks based on a subset of one or more of the plurality of selectors of different types {s1, s2, . . . }, to generate new plural encrypted units of content/data 608 for the new location, i.e., the hard disk holding the paged out memory pages, the device which made the DMA, or memory of the computing device now hosting the migrated VM. In embodiments, the pseudo decryption, if performed, may be performed e.g., by one of the decryption engines, whereas, the additional encryption, if performed, may be performed e.g., by the recipient device, such as, the hard disk receiving the memory page being paged out, the I/O device making the DMA, or the computer system receiving the VM being migrated.

Thus, the diffusion of the multi-stage (split-diffusion) memory integrity technology may provide the cryptographic combination of the selector/color value with the content/data. The content/data becomes entwined with the corresponding selector/color, so the meta data of the selector no longer needs to be remembered when storing the data. For inherent integrity, the diffusion results in a pseudo random result that destroys patterns in the plaintext data. Accordingly, when a diffused unit of content/data is read back from memory, and patterns reemerge in the unit of content/data after, it can be assumed that the integrity is preserved (i.e., the ciphertext was not modified and the right selector/color was used to access the data). On the other hand, if patterns do not emerge, an integrity check value (ICV) (e.g., one stored in memory as an integrity check value 330) may be additionally used to ensure the integrity of the unit of content/data. If the ICV doesn't match the retrieved unit of content/data, an error may then be returned and processed as disclosed herein.

For example, a pattern may be a number of repeated bytes, words, etc. found in the unit of content/data that is improbable in a pseudorandom sequence of bits (which would be the result of decrypting a corrupted ciphertext). A pattern detector checking for four repeating words may be used (that is, four 16-bit values are found to repeat in the 64 bytes of content/data). If four repeating words after de-diffusion is found, integrity may be assumed (i.e., the probability of this to occur in a pseudorandom sequence of 64 bytes of content/data is less than one in a billion, but fairly typically of real structured data), otherwise, a corresponding ICV stored in computer device memory 250, such as integrity check value 330, may be employed to double check to ensure integrity of the unit of content/data has not been compromised.

Figure 7:
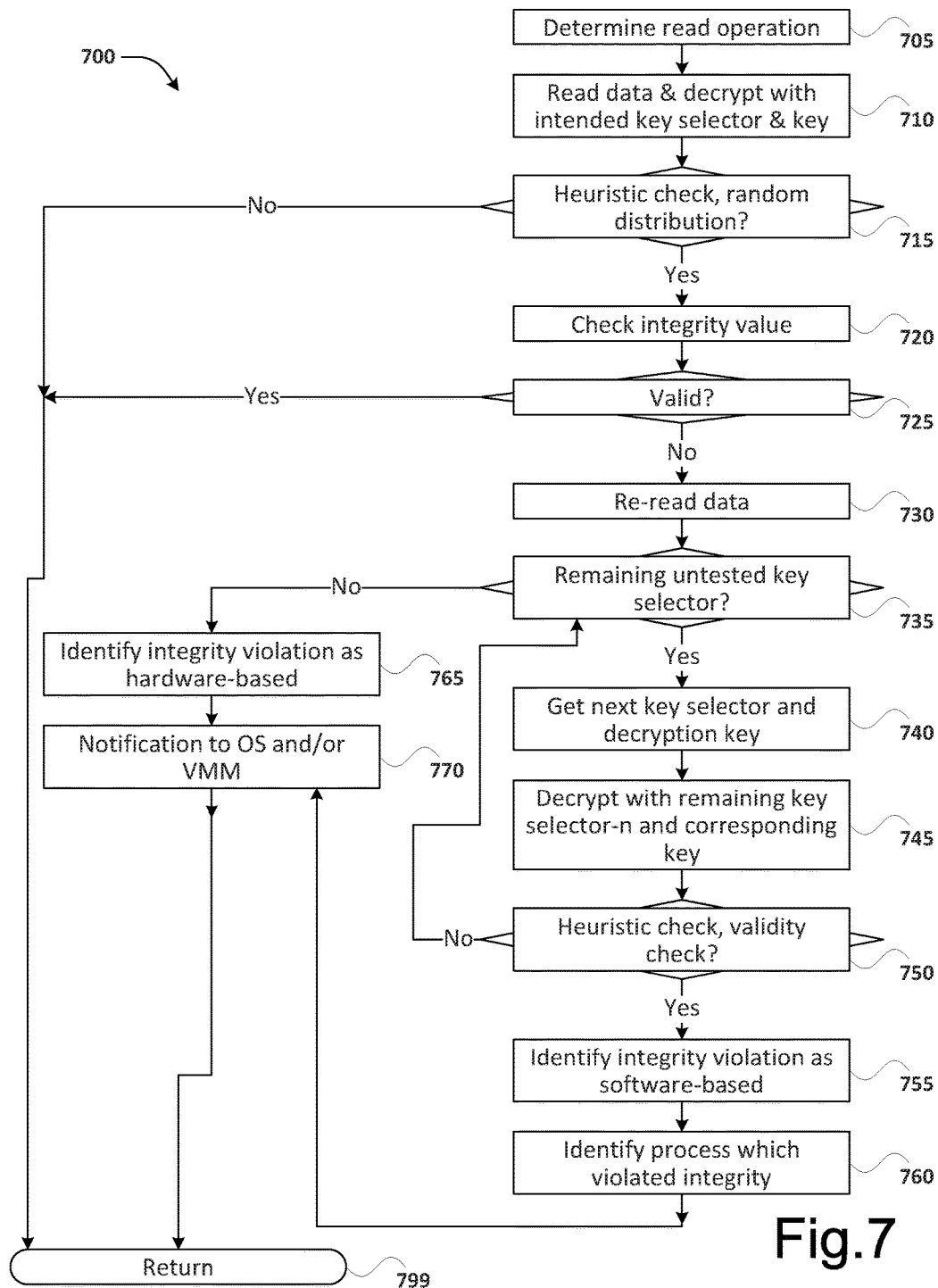
FIG. 7 is a flow diagram illustrating an example of a method performed by an integrity violation analysis module, according to some embodiments.

Referring now to FIG. 7, illustrating an overview of integrity violation analysis module 700, according to various embodiments.

At block 705, integrity violation analysis module 700 may determine that a read operation has been initiated with respect to a unit of data, such as a plural encrypted data 325 record.

At block 710, integrity violation analysis module 700 may read plural encrypted data 325 record, obtain intended key selector 305 and corresponding key 310, use key 310 to decrypt plural encrypted data 325 record into, for example, one or more unencrypted data 315 record and/or partially decrypted data 320 record. Key 310 records may be conceived of as a list or array of keys, where key selector 305 records are used as an index to point to or select a specific key, wherein the key is then used for encryption or decryption.

At decision block 715, integrity violation analysis module 700 may perform a heuristic check, to determine if unencrypted data 315 record and/or partially decrypted data 320 record contains a random distribution. The heuristic check may look for presence of order above a threshold. The heuristic check may perform a compression function; for example, if compression is possible, order may be found in the unencrypted data 315 record and/or partially decrypted data 320 record. The amount of order may be determined according to, for example, a difference in the amount of data in compressed and uncompressed versions of the unencrypted data 315 record and/or partially decrypted data 320 record.

If heuristic check of decision block 715 is negative or equivalent (indicating that the unencrypted data 315 record and/or partially decrypted data 320 record has order above a threshold), then at done block 799, integrity violation analysis module 700 may return to block 705, may return to a process which may have spawned it, or may conclude.

If heuristic check of decision block 715 is affirmative or equivalent (indicating that the unencrypted data 315 record and/or partially decrypted data 320 record does not have order above a threshold), then at block 720, integrity violation analysis module 700 may obtain an ICV created during creation of plural encrypted data 325 record, such as integrity check value 330 record. At block 720, integrity violation analysis module 700 may also calculate an ICV for the unencrypted data 315 record and/or partially decrypted data 320 record.

At decision block 725, integrity violation analysis module 700 may determine whether the stored integrity check value 330 record and the calculated ICV match or are valid. If affirmative or equivalent (which indicates that a seemingly random value is intended), integrity violation analysis module 700 may proceed to done block 799.

If negative or equivalent at decision block 725, integrity violation analysis module 700 may determine that an integrity violation with respect to the plural encrypted data has occurred, may re-read or otherwise obtain plural encrypted data 325 record at block 730, and may, at decision block 735, determine whether any untested key selectors (or keys corresponding thereto) remain in selector 305 records (also referred to herein as a "remaining key selector").

If affirmative or equivalent at block 735, integrity violation analysis module 700 may re-read or otherwise obtain plural encrypted data 325 record. At block 740, integrity violation analysis module 700 may obtain a remaining selector 305 and corresponding decryption key 310. Remaining selector 305 and corresponding decryption key 310 may be obtained, for example, by incrementing the previous key selector 305 and obtaining the corresponding key 310. Remaining selector 305 may (or may not) have been assigned to or used by another process, thread, page, cache line or other data unit (not all selectors 305 need be assigned to or used by another process). At block 745, integrity violation analysis module 700 may decrypt plural encrypted data 325 record with the then current remaining decryption key 310.

At decision block 750, integrity violation analysis module 700 may perform a heuristic check, similar to heuristic check of 715, to determine whether the decrypted result of block 745 produces order above a threshold or the like. If affirmative or equivalent, integrity violation analysis module 700 may proceed to block 755. If not, decision block 750 may (re)obtain or reference an ICV created during creation of plural encrypted data 325 record, such as integrity check value 330 record and integrity violation analysis module 700 may also calculate or re-reference a previously calculated ICV for the unencrypted data 315 record and/or partially decrypted data 320 record and determine whether the decrypted value of block 745 corresponds to an ICV created during creation of plural encrypted data 325 record. If negative or equivalent, integrity violation analysis module 700 may return to decision block 735 to iterate over other untested remaining key selector 305 records, if any.

If affirmative or equivalent at decision block 750, this indicates that the plural encrypted data 325 record was created by an incorrect process, either due to a bug or due to an attack. Consequently, integrity violation analysis module 700 may, at block 755, identify that the integrity violation determined at block 725 was software-based.

At block 760, integrity violation analysis module 700 may identify or cause to be identified the process which was assigned or otherwise which was intended to use the remaining key selector 305 of block 740 and/or integrity violation analysis module 700 may use last branch records or the like to identify a process, thread, or the like which caused the creation of the plural encrypted data 325 record which lacked data integrity. This block may be accomplished by passing the physical address of the request, such as of block 705, which lead to a determination of lack of data integrity, to an operating system, such as operating system 280, such that the operating system can identify the process, thread, or the like which caused the creation of the plural encrypted data 325 record which lacked data integrity.

At block 770, and if not already performed at block 765, integrity violation analysis module 700 may send a notification, signal, or the like to operating system 280 and/or virtual machine monitor 251 indicating that an integrity violation occurred, that it was software-based, and, if available, indicating the process(es)/application/thread which were involved or providing information to allow an operating system or the like to make this determination. This notification may allow the operating system 280 and/or virtual machine monitor 251 to terminate the process(es)/application. Operating system 280 and/or virtual machine monitor 251 may also respond by initiating bug tracking and/or bug reporting modules with respect to the process(es)/application/thread and/or by sending an external notification.

If negative or equivalent at decision block 735, this indicates that the memory integrity violation of decision block 725 is hardware-based, whether due to an error (as may be cause by a hardware error, environmental radiation, or the like) or an attack (such as a row-hammer attack). Consequently, at block 765, integrity violation analysis module 700 may identify the integrity violation as being hardware-based.

At block 770, integrity violation analysis module 700 may send a notification, signal, or the like to operating system 280 indicating that an integrity violation occurred and that it was hardware-based. This notification may cause operating system 280 to initiate a hardware reset, to provide a user notification that a hardware reset is necessary or is recommended, and/or to provide a notification that service of computer device 200 should be considered.

Following are examples:

Example 1

An apparatus for providing memory integrity, comprising: an integrity violation analysis module to determine a cause of an integrity violation in relation to an encrypted unit of data, wherein to determine the cause of the integration violation, the integrity violation analysis module is to determine, in response to a determination of a presence of the integrity violation, the cause of the integrity violation based on whether at least a portion of the encrypted unit of data can be successfully decrypted with a plurality of key keys.

Example 2

The apparatus according to Example 1, wherein the integrity violation analysis module is to determine or cause to be determined the presence of the integrity violation and wherein to determine the presence of the integrity violation comprises to heuristically evaluate a partially or fully decrypted unit of data generated from at least the portion of the encrypted unit of data using an intended key, wherein the intended key is associated with the encrypted unit of data and is one of the plurality of keys.

Example 3

The apparatus according to Example 2, wherein heuristically evaluate comprises evaluate for a presence of order above a threshold.

Example 4

The apparatus according to Example 3, wherein evaluate for the presence of order above the threshold comprises perform at least one of a compression function or a check for a repeated bit or byte above a threshold value.

Example 5

The apparatus according to Example 3, wherein when heuristically evaluate does not indicate the presence of order above the threshold, the integrity violation analysis module is further to evaluate or cause to be evaluated an integrity check value associated with the encrypted data line.

Example 6

The apparatus according to Example 5, wherein if evaluate the integrity check value is unsuccessful, the integrity violation analysis module is further to evaluate the encrypted unit of data using a remaining key in the plurality of keys to determine if the remaining key is able to decrypt the encrypted unit of data, wherein the remaining key is a key in the plurality of keys and is not the intended key.

Example 7

The apparatus according to Example 6, wherein if no remaining key in the plurality of keys is able to decrypt the encrypted unit of data, the integrity violation analysis module is to determine the cause of the integrity violation to be a hardware-based error.

Example 8

The apparatus according to Example 7, wherein the integrity violation analysis module is further to output or cause to be outputted a signal to an operating system or a virtual machine monitor regarding the cause of the integrity violation.

Example 9

The apparatus according to Example 8, wherein the signal is to cause the operating system or the virtual machine monitor to reset a hardware system, wherein the hardware system executes the operating system or the virtual machine monitor.

Example 10

The apparatus according to Example 6, wherein if the remaining key is able to decrypt the encrypted unit of data, the integrity violation analysis module is to determine the cause of the integrity violation to be a software-based error.

Example 11

The apparatus according to Example 10, wherein the integrity violation analysis module is further to output or cause to be outputted a signal to an operating system regarding the cause of the integrity violation.

Example 12

The apparatus according to Example 11, wherein the signal is to cause the operating system to at least one of terminate an application associated with the encrypted unit of data or provide a debug data regarding the application associated with the encrypted unit of data.

Example 13

The apparatus according to Example 1, wherein the encrypted unit of data is encrypted in a multi-stage encryption process using a plurality of encryption engines.

Example 14

The apparatus according to Example 1, wherein the apparatus comprises a plurality of encryption engines and a computer processor, wherein the integrity violation analysis module is coupled to the computer processor and the plurality of encryption engines decrypt the encrypted unit of data with at least one of the plurality of keys.

Example 15

The apparatus according to Example 2, wherein each of the plurality of keys is associated with the encrypted unit of data via at least one of a plurality of key selectors, wherein the integrity violation module is to further to select the intended key according to an intended key selector among the plurality of key selectors, and wherein the integrity violation module is to further to at least partially decrypt or cause to be at least partially decrypted at least the portion of the encrypted unit of data with the intended key to form a decrypted data line portion.

Example 16

A computer implemented method, comprising: in response to a determination of an integrity violation in relation to an encrypted unit of data, determining a cause of the integrity violation based on whether at least a portion of the encrypted unit of data can be successfully decrypted with a plurality of keys.

Example 17

The method according to Example 16, further comprising determining or causing to be determined the integrity violation wherein determining the integrity violation comprises heuristically evaluating a partially or fully decrypted unit of data generated from at least the portion of the encrypted unit of data using an intended key, wherein the intended key is associated with the encrypted unit of data and is one of the plurality of keys.

Example 18

The method according to Example 17, wherein heuristically evaluating comprises evaluating for a presence of order above a threshold.

Example 19

The method according to Example 18, wherein evaluating for the presence of order above the threshold comprises performing at least one of a compression function or a check for a repeated bit or byte above a threshold value.

Example 20

The method according to Example 18, wherein when heuristically evaluating does not indicate the presence of order above the threshold, further comprising evaluating or causing to be evaluated an integrity check value associated with the encrypted data line.

Example 21

The method according to Example 20, wherein if evaluating the integrity check value is unsuccessful, further comprising evaluating the encrypted unit of data using a remaining key in the plurality of keys to determine if the remaining key is able to decrypt the encrypted unit of data, wherein the remaining key is a key in the plurality of keys and is not the intended key.

Example 22

The method according to Example 21, wherein if no remaining key in the plurality of keys is able to decrypt the encrypted unit of data, further comprising determining the cause of the integrity violation to be a hardware-based error.

Example 23

The method according to Example 22, further comprising outputting or causing to be outputted a signal to an operating system or a virtual machine monitor regarding the cause of the integrity violation.

Example 24

The method according to Example 23, wherein the signal is to cause the operating system or the virtual machine monitor to reset a hardware system, wherein the hardware system executes the operating system or the virtual machine monitor.

Example 25

The method according to Example 21, wherein if the remaining key is able to decrypt the encrypted unit of data, further comprising determining the cause of the integrity violation to be a software-based error.

Example 26

The method according to Example 25, further comprising outputting or causing to be outputted a signal to an operating system regarding the cause of the integrity violation.

Example 27

The method according to Example 26, wherein the signal is to cause the operating system to at least one of terminate an application associated with the encrypted unit of data or provide a debug data regarding the application associated with the encrypted unit of data.

Example 28

The method according to Example 16, wherein the encrypted unit of data is a encrypted in a multi-stage encryption process using a plurality of encryption engines.

Example 29

The method according to Example 16, wherein the method is performed by an apparatus comprising a plurality of encryption engines and a computer processor, wherein the plurality of encryption engines decrypt the encrypted unit of data with at least one of the plurality of keys.

Example 30

The method according to Example 17, wherein each of the plurality of keys is associated with the encrypted unit of data via at least one of a plurality of key selectors, and further comprising selecting the intended key according to an intended key selector among the plurality of key selectors, and at least partially decrypting or causing to be at least partially decrypted at least the portion of the encrypted unit of data with the intended key selected to form a decrypted data line portion.

Example 31

An apparatus for computing, comprising: in response to a determination of a presence of an integrity violation in relation to an encrypted unit of data and means to determine a cause of the integrity violation based on whether at least a portion of the encrypted unit of data can be successfully decrypted with a plurality of keys.

Example 32

The apparatus according to Example 31, further comprising means to determine or cause to be determined the presence of the integrity violation, wherein means to determine the presence of the integrity violation comprises means to heuristically evaluate a partially or fully decrypted unit of data generated from at least the portion of the encrypted unit of data using an intended key, wherein the intended key is associated with the encrypted unit of data and is one of the plurality of keys.

Example 33

The apparatus according to Example 32, wherein means to heuristically evaluate comprises means to heuristically evaluate for a presence of order above a threshold.

Example 34

The apparatus according to Example 33, wherein means to evaluate for the presence of order above the threshold comprises means to perform at least one of a compression function or a check for a repeated bit or byte above a threshold value.

Example 35

The apparatus according to Example 33, wherein when heuristically evaluate does not indicate the presence of order above the threshold, further comprising means to evaluate or cause to be evaluated an integrity check value associated with the encrypted data line.

Example 36

The apparatus according to Example 35, wherein if evaluate the integrity check value is unsuccessful, further comprising means to evaluate the encrypted unit of data using a remaining key in the plurality of keys to determine if the remaining key is able to decrypt the encrypted unit of data, wherein the remaining key is a key in the plurality of keys and is not the intended key.

Example 37

The apparatus according to Example 36, further comprising means to, if no remaining key in the plurality of keys is able to decrypt the encrypted unit of data, determine the cause of the integrity violation to be a hardware-based error.

Example 38

The apparatus according to Example 37, further comprising means to output or cause to be outputted a signal to an operating system or a virtual machine monitor regarding the cause of the integrity violation.

Example 39

The apparatus according to Example 38, further comprising means to cause the operating system or the virtual machine monitor, in response to the signal, to reset a hardware system, wherein the hardware system executes the operating system or the virtual machine monitor.

Example 40

The apparatus according to Example 36, further comprising means to, if the remaining key is able to decrypt the encrypted unit of data, determine the cause of the integrity violation to be a software-based error.

Example 41

The apparatus according to Example 40, further comprising means to output or cause to be outputted a signal to an operating system regarding the cause of the integrity violation.

Example 42

The apparatus according to Example 41, further comprising means to cause the operating system, in response to the signal, to at least one of terminate an application associated with the encrypted unit of data or provide a debug data regarding the application associated with the encrypted unit of data.

Example 43

The apparatus according to Example 31, wherein the encrypted unit of data is encrypted in a multi-stage encryption process using a plurality of encryption engines.

Example 44

The apparatus according to Example 31, wherein the apparatus comprises a plurality of encryption engines and a computer processor coupled to the means determine the cause of the integrity violation, and wherein the means determine the cause of the integrity violation comprises means to decrypt the encrypted unit of data with at least one of the plurality of keys using at least one of the plurality of encryption engines.

Example 45

The apparatus according to Example 32, wherein each of the plurality of keys is associated with the encrypted unit of data via at least one of a plurality of key selectors, and further comprising means to select the intended key according to an intended key selector among the plurality of key selectors, and further comprising means to at least partially decrypt or cause to be at least partially decrypted at least the portion of the encrypted unit of data with the intended key to form a decrypted data line portion.

Example 46

One or more computer-readable media comprising instructions that cause a computer device, in response to execution of the instructions by a processor of the computer device, to: in response to a determination of an integrity violation in relation to an encrypted unit of data, determine a cause of the integrity violation based on whether at least a portion of the encrypted unit of data can be successfully decrypted with a plurality of keys.

Example 47

The computer-readable media according to Example 46, further comprising determine or cause to be determined the integrity violation wherein determine the integrity violation comprises heuristically evaluate a partially or fully decrypted unit of data generated from at least the portion of the encrypted unit of data using an intended key, wherein the intended key is associated with the encrypted unit of data and is one of the plurality of keys.

Example 48

The computer-readable media according to Example 47, wherein heuristically evaluate comprises evaluate for a presence of order above a threshold.

Example 49

The computer-readable media according to Example 48, wherein evaluate for the presence of order above the threshold comprises perform at least one of a compression function or a check for a repeated bit or byte above a threshold value.

Example 50

The computer-readable media according to Example 48, wherein when heuristically evaluating does not indicate the presence of order above the threshold, further comprising evaluating or causing to be evaluated an integrity check value associated with the encrypted data line.

Example 51

The computer-readable media according to Example 50, wherein if evaluate the integrity check value is unsuccessful, further comprising evaluate the encrypted unit of data using a remaining key selector in the plurality of keys to determine if the remaining key is able to decrypt the integrity check value, wherein the remaining key is a key in the plurality of keys and is not the intended key.

Example 52

The computer-readable media according to Example 51, wherein if the no remaining key is able to decrypt the encrypted unit of data, further comprising determine the cause of the integrity violation to be a hardware-based error.

Example 53

The computer-readable media according to Example 52, further comprising output or cause to be outputted a signal to an operating system or a virtual machine monitor regarding the cause of the integrity violation.

Example 54

The computer-readable media according to Example 53, wherein the signal is to cause the operating system or the virtual machine monitor to reset a hardware system, wherein the hardware system executes the operating system or the virtual machine monitor.

Example 55

The computer-readable media according to Example 51, wherein if the remaining key is able to decrypt the encrypted unit of data, further comprising determine the cause of the integrity violation to be a software-based error.

Example 56

The computer-readable media according to Example 55, further comprising output or cause to be outputted a signal to an operating system regarding the cause of the integrity violation.

Example 57

The computer-readable media according to Example 56, wherein the signal is to cause the operating system to at least one of terminate an application associated with the encrypted unit of data or provide a debug data regarding the application associated with the encrypted unit of data.

Example 58

The computer-readable media according to Example 46, wherein the encrypted unit of data is encrypted in a multi-stage encryption process using a plurality of encryption engines.

Example 59

The computer-readable media according to Example 46, wherein the computer device comprises a plurality of encryption engines and a computer processor, wherein at least one of the plurality of encryption engines decrypts the encrypted unit of data with at least one of the plurality of keys.

Example 60

The computer-readable media according to Example 47, wherein each of the plurality of keys is associated with the encrypted unit of data via at least one of a plurality of key selectors, and further comprising select the intended key according to an intended key selector among the plurality of key selectors, and partially decrypt or cause to be at least partially decrypted at least the portion of the encrypted unit of data with the intended key to form a decrypted data line portion.

Example 61

A system for computing, comprising: a memory; a central processing unit ("CPU") to determine, in response to a detection of a presence of an integrity violation in relation to an encrypted unit of data, a cause of the integrity violation based on whether at least a portion of the encrypted unit of data can be successfully decrypted with a plurality of keys; and a wireless communication interface to communicate to a network.

Example 62

The system according to Example 61, wherein the CPU further determines the presence of the integrity violation by heuristically evaluate a partially or fully decrypted unit of data generated from at least the portion of the encrypted unit of data using an intended key, wherein the intended key is associated with the encrypted unit of data and is one of the plurality of keys, wherein a least one of the plurality of keys is associated with the encrypted unit of data via at least one of a plurality of key selectors, and wherein the CPU further selects the intended key according to an intended key selector among the plurality of key selectors.

Example 63

The system according to Example 62, wherein when heuristically evaluate does not indicate the presence of order above the threshold, the CPU evaluates an integrity check value associated with the encrypted data line.

Example 64

The system according to Example 63, wherein if evaluate the integrity check value is unsuccessful, the CPU evaluates the encrypted unit of data using a remaining key in the plurality of keys to determine if the remaining key is able to decrypt the encrypted unit of data, wherein the remaining key is a key in the plurality of keys and is not the intended key.

Example 65

The system according to Example 64, wherein the CPU further, if no remaining key in the plurality of keys is able to decrypt the encrypted unit of data, determines the cause of the integrity violation to be a hardware-based error or, if the remaining key is able to decrypt the encrypted unit of data, determines the cause of the integrity violation to be a software-based error.

Example 66

The system according to Example 65, wherein the CPU further outputs or cause to be outputted a signal to an operating system or a virtual machine monitor regarding the cause of the integrity violation, wherein if the integrity violation is determined to be the hardware-based error, the CPU causes the operating system or the virtual machine monitor, in response to the signal, to reset the CPU, wherein the CPU executes the operating system or the virtual machine monitor, and wherein if the integrity violation is determined to be the software-based error, the CPU and memory cause the operating system, in response to the signal, to at least one of terminate an application associated with the encrypted unit of data or provide a debug data regarding the application associated with the encrypted unit of data.

Example 67

The system according to Example 62, further comprising a plurality of encryption engines, wherein the CPU decrypts the encrypted unit of data with at least one of the plurality of keys using at least one of the plurality of encryption engines.

The invention claimed is:
1. An apparatus to evaluate a memory integrity violation (IV), comprising:
an integrity violation analysis (IVA) module to determine a cause of an IV in relation to an encrypted unit of data, wherein the IVA module is to:
determine a presence of the IV; and
in response to the determination, determine the IV cause based on whether at least a portion of the encrypted unit of data can be successfully decrypted with a plurality of keys, including an intended key associated with the encrypted unit of data, wherein:
if no key in the plurality of keys is able to decrypt the encrypted unit of data, the IVA module is to determine the cause of the IV to be a hardware-based error, and
if a key of the plurality of keys other than the intended key is able to decrypt the encrypted unit of data, the IVA module is to determine the cause of the IV to be a software-based error.
2. The apparatus of claim 1,
wherein to determine the presence of the IV includes to heuristically evaluate a partially or fully decrypted unit of data generated from at least the portion of the encrypted unit of data using the intended key,
wherein at least one of the plurality of keys is associated with the encrypted unit of data via at least one of a plurality of key selectors, wherein the IVA module is further to select the intended key according to an intended key selector among the plurality of key selectors, and wherein heuristically evaluate is further to evaluate for a presence of order above a threshold by performing at least one of a compression function or a check for a repeated bit or byte above a threshold value.
3. The apparatus of claim 2, wherein when a heuristical evaluation does not indicate the presence of order above the threshold, the IVA module is further to evaluate or cause to be evaluated an integrity check value associated with an encrypted data line.
4. The apparatus of claim 3, wherein if an evaluation of the integrity check value is unsuccessful, the IVA module is further to evaluate the encrypted unit of data using a remaining key, in the plurality of keys, that is not the intended key to determine if the remaining key is able to decrypt the encrypted unit of data.
5. The apparatus of claim 1,
wherein the IVA module is further to output or cause to be outputted a signal to an operating system or a virtual machine monitor regarding the cause of the IV, and wherein:
if the IV is determined to be the hardware-based error, the signal is to cause the operating system or the virtual machine monitor to reset a hardware system, wherein the hardware system executes the operating system or the virtual machine monitor, and
if the integrity violation is determined to be the software-based error, the signal is to cause the operating system to at least one of: terminate an application associated with the encrypted unit of data or provide debug data regarding the application associated with the encrypted unit of data.
6. A computer implemented method for evaluating a memory integrity violation, comprising:
determining a presence of an IV in relation to an encrypted unit of data and, in response to the determination,
determining a cause of the IV based on whether at least a portion of the encrypted unit of data can be successfully decrypted with a plurality of keys, including an intended key associated with the encrypted unit of data, and further comprising:
if no key in the plurality of keys is able to decrypt the encrypted unit of data, determining that the cause of the IV is a hardware-based error, and
if a key of the plurality of keys other than the intended key is able to decrypt the encrypted unit of data, determining the cause of the IV to be a software-based error.

7. The method of claim 6, wherein determining the presence of the integrity violation further comprises heuristically evaluating a partially or fully decrypted unit of data generated from at least the portion of the encrypted unit of data using the intended key,
wherein at least one of the plurality of keys is associated with the encrypted unit of data via at least one of a plurality of key selectors, further comprising selecting the intended key according to an intended key selector among the plurality of key selectors,
and wherein heuristically evaluating further comprises evaluate for a presence of order above a threshold by performing at least one of a compression function or a check for a repeated bit or byte above a threshold value.

8. The method according to claim 7, wherein when a heuristic evaluation does not indicate the presence of order above the threshold, further comprising evaluating or causing to be evaluated an integrity check value associated with an encrypted data line.

9. The method according to claim 8, wherein if evaluating the integrity check value is unsuccessful, further comprising evaluating the encrypted unit of data using a remaining key of the plurality of keys, different than the intended key, to determine if the remaining key is able to decrypt the encrypted unit of data.

10. The method of claim 6, further comprising outputting or causing to be outputted a signal to an operating system or a virtual machine monitor regarding the cause of the IV, and if the cause of the IV is determined to be the hardware-based error, the signal is to cause the operating system or the virtual machine monitor to reset a hardware system, that executes the operating system or the virtual machine monitor,
and if the cause of the IV is determined to be the software-based error, the signal is to cause the operating system to at least one of terminate an application associated with the encrypted unit of data or provide debug data regarding the application associated with the encrypted unit of data.

11. A system for computing, comprising:
a memory;
a central processing unit ("CPU") to determine, in response to a detection of a presence of an integrity violation (IV) in relation to an encrypted unit of data, a cause of the IV based on whether at least a portion of the encrypted unit of data can be successfully decrypted with a plurality of keys, including an intended key associated with the encrypted unit of data, wherein:
if no key in the plurality of keys is able to decrypt the encrypted unit of data, the CPU to determine that the cause of the IV is a hardware-based error, and
if a key of the plurality of keys other than the intended key is able to decrypt the encrypted unit of data, the CPU to determine that the cause of the IV is a software-based error; and
a wireless communication interface to communicate to a network.

12. The system of claim 11, wherein the CPU further determines the presence of the IV by a heuristic evaluation of a partially or fully decrypted unit of data generated from at least the portion of the encrypted unit of data using the intended key, wherein at least one of the plurality of keys is associated with the encrypted unit of data via at least one of a plurality of key selectors, and wherein the CPU further selects the intended key according to an intended key selector of the plurality of key selectors.

13. The system of claim 12, wherein when the heuristic evaluation does not indicate the presence of order above a threshold, the CPU evaluates an integrity check value associated with an encrypted data line.

14. The system of claim 13, wherein if evaluation of the integrity check value is unsuccessful, the CPU evaluates the encrypted unit of data using a remaining key, other than the intended key, to determine if the remaining key is able to decrypt the encrypted unit of data.

15. The system of claim 11, wherein the CPU is to further outputs or cause to be outputted a signal to an operating system or a virtual machine monitor executed by the CPU regarding the cause of the IV,
wherein if the IV is determined to be the hardware-based error, the CPU is further to causes the operating system or the virtual machine monitor, in response to the signal, to reset the CPU, and
wherein if the integrity violation is determined to be the software-based error, the CPU and memory are further to cause the operating system, in response to the signal, to at least one of: terminate an application associated with the encrypted unit of data or provide debug data regarding the application associated with the encrypted unit of data.

16. The system of claim 12, further comprising a plurality of encryption engines, wherein the CPU decrypts the encrypted unit of data with at least one of the plurality of keys using at least one of the plurality of encryption engines.

17. One or more computer-readable media comprising instructions that cause a computer device, in response to execution of the instructions by a processor of the computer device, to:
determine a presence of an IV in relation to an encrypted unit of data; and
determine a cause of the IV based on whether at least a portion of the encrypted unit of data can be successfully decrypted with a plurality of keys, including an intended key associated with the encrypted unit of data, to determine further to include:
if no key in the plurality of keys is able to decrypt the encrypted unit of data, determine the cause of the IV to be a hardware-based error, and
if a key of the plurality of keys other than the intended key is able to decrypt the encrypted unit of data, determine the cause of the IV to be a software-based error.

18. The computer-readable media of claim 17, wherein determine the presence of the IV further includes to heuristically evaluate a partially or fully decrypted unit of data generated from at least the portion of the encrypted unit of data using the intended key,
wherein at least one of the plurality of keys is associated with the encrypted unit of data via at least one of a plurality of key selectors, and, when executed, the instructions further cause the processor to select the intended key according to one of the plurality of key selectors,
and wherein heuristically evaluate further includes to evaluate for a presence of order above a threshold by performing at least one of a compression function or a check for a repeated bit or byte above a threshold value.

19. The computer-readable media of claim 18, wherein when a heuristic evaluation does not indicate the presence of order above the threshold, when executed, the instructions further cause the processor to evaluate or cause to be evaluated an integrity check value associated with an encrypted data line.

20. The computer-readable media of claim 19, wherein if evaluate the integrity check value is unsuccessful, when executed, the instructions further cause the processor to evaluate the encrypted unit of data using a remaining key in of the plurality of keys, different than the intended key, to determine if the remaining key is able to decrypt the integrity check value.

21. The computer-readable media of claim 17,
wherein when executed, the instructions further cause the processor to output or cause to be outputted a signal to an operating system or a virtual machine monitor regarding the cause of the IV,
wherein if the IV is determined to be the hardware-based error, the signal causes the operating system or the virtual machine monitor to reset a hardware system, wherein the hardware system executes the operating system or the virtual machine monitor,
and wherein if the IV is determined to be the software-based error, the signal causes the operating system to at least one of terminate an application associated with the encrypted unit of data or provide debug data regarding the application associated with the encrypted unit of data.

* * * * *

UNITED STATES PATENT AND TRADEMARK OFFICE
CERTIFICATE OF CORRECTION

PATENT NO. : 10,261,854 B2  
APPLICATION NO. : 15/283059  
DATED : April 16, 2019  
INVENTOR(S) : Sergej Deutsch et al.

Page 1 of 1

It is certified that error appears in the above-identified patent and that said Letters Patent is hereby corrected as shown below:

In the Claims

Column 26  
Line 11, "outputs..." should read – "output..."  
Line 16, "...to causes..." should read – "...to cause..."

Column 27  
Lines 4-5, "...in of..." should read – "...of..."

Signed and Sealed this  
Fourth Day of June, 2019

Andrei Iancu  
*Director of the United States Patent and Trademark Office*